(12) United States Patent
John et al.

(10) Patent No.: US 10,303,200 B2
(45) Date of Patent: May 28, 2019

(54) CLOCK DIVIDER DEVICE AND METHODS THEREOF

(71) Applicant: Advanced Micro Devices, Inc., Sunnyvale, CA (US)

(72) Inventors: Deepesh John, Austin, TX (US); Steven Kommrusch, Fort Collins, CO (US); Vibhor Mittal, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 106 days.

(21) Appl. No.: 15/441,613

(22) Filed: Feb. 24, 2017

(65) Prior Publication Data

US 2018/0246557 A1  Aug. 30, 2018

(51) Int. Cl.
*G06F 1/32* (2019.01)
*G06F 1/08* (2006.01)
*G06F 1/3203* (2019.01)

(52) U.S. Cl.
CPC .............. *G06F 1/08* (2013.01); *G06F 1/3203* (2013.01)

(58) Field of Classification Search
USPC ......................................................... 713/322
See application file for complete search history.

(56) References Cited

U.S. PATENT DOCUMENTS

| | | | |
|---|---|---|---|
| 5,814,972 A | 9/1998 | Shimada et al. | |
| 6,370,643 B1 | 4/2002 | Kubo | |
| 7,007,188 B1 | 2/2006 | Tischler et al. | |
| 7,076,679 B2 | 7/2006 | Fischer et al. | |
| 8,933,737 B1 | 1/2015 | Chatterjee et al. | |
| 9,317,342 B2 | 4/2016 | Dighe | |
| 2003/0126377 A1 | 7/2003 | Orenstien et al. | |
| 2004/0119521 A1* | 6/2004 | Kurd .................. | G06F 1/10 327/291 |
| 2004/0183613 A1* | 9/2004 | Kurd .................. | G01K 7/32 331/186 |
| 2005/0022042 A1 | 1/2005 | Tam et al. | |
| 2005/0110545 A1 | 5/2005 | Mahrla | |
| 2006/0206746 A1 | 9/2006 | Yamada et al. | |
| 2009/0138748 A1 | 5/2009 | Kim et al. | |
| 2011/0264952 A1 | 10/2011 | Heinrichs et al. | |
| 2012/0169373 A1* | 7/2012 | Langadi .............. | G06F 1/08 326/93 |

(Continued)

FOREIGN PATENT DOCUMENTS

WO  2013078311 A1  5/2013

OTHER PUBLICATIONS

U.S. Appl. No. 15/208,388, filed Jul. 12, 2016 in the name of Steven Kommrusch et al.

(Continued)

*Primary Examiner* — Jaweed A Abbaszadeh
*Assistant Examiner* — Volvick Derose

(57) ABSTRACT

A method for implementing clock dividers includes providing, in response to detecting a voltage drop at a processor core, an input clock signal to a transmission gate multiplexer for selecting between one of two stretch-enable signals. In some embodiments, selecting between the one of two stretch-enable signals includes inputting a set of core clock enable signals into a clock divider circuit, and modifying the set of core clock enable signals to generate the stretch-enable signals. An output clock signal is generated based on the selected stretch-enable signal.

18 Claims, 4 Drawing Sheets

(56) References Cited

U.S. PATENT DOCUMENTS

| | | | | |
|---|---|---|---|---|
| 2012/0187991 | A1* | 7/2012 | Sathe | H03K 5/135 |
| | | | | 327/158 |
| 2014/0254734 | A1* | 9/2014 | Abdelmoneum | H03L 7/0995 |
| | | | | 375/376 |
| 2015/0002197 | A1* | 1/2015 | Chatterjee | H03L 7/095 |
| | | | | 327/159 |
| 2016/0179163 | A1 | 6/2016 | Haider et al. | |
| 2017/0038789 | A1 | 2/2017 | Pal et al. | |
| 2017/0038814 | A1* | 2/2017 | Pal | G06F 1/08 |
| 2017/0300080 | A1* | 10/2017 | Jain | G06F 1/04 |
| 2018/0091125 | A1* | 3/2018 | Carlson | H03K 5/06 |

OTHER PUBLICATIONS

International Search Report and Written Opinion dated Apr. 12, 2017 in PCT Application No. PCT/US2016/051814, 14 pages.
European Search Report dated Jun. 16, 2017 in EP Application No. 16201253.8, 4 pages.
Examination Report dated Jul. 11, 2017 for EP Application No. 16 201 253.8, 12 pages.
Summons to attend oral proceedings pursuant to Rule 1151(1) EPC dated Feb. 15, 2018 for European Application No. 16201253.8, 14 pages.
International Search Report and Written Opinion for PCT Application No. PCT2018018718, 14 pages.
Non-Final Office Action dated Aug. 23, 2018 for U.S. Appl. No. 15/208,388, 40 pages.
International Preliminary Report on Patentability dated Jan. 24, 2019 for International Application No. PCT/US2016/051814, 11 pages.

* cited by examiner

CLOCK DIVIDER DEVICE AND METHODS THEREOF

BACKGROUND

Description of the Related Art

A data processing device, such as an integrated circuit (IC) microprocessor device, can include a large number of data subsystems fabricated at a single semiconductor die. For example, an IC microprocessor device can include a memory interface subsystem and a graphics acceleration subsystem in addition to a central processing unit. Each data subsystem can operate as a data processor and can include disparate operating frequency limitations. Therefore, the computational performance of the microprocessor device is typically improved if each data subsystem is configured to operate at a respective frequency that can be different from that of another data subsystem. Furthermore, it can be advantageous if the operating frequency of a particular data subsystem can be changed efficiently while the data subsystem continues to operate. For example, the microprocessor can transition a data subsystem between an active or nominal power operating mode and a low-power operating mode by altering the frequency of a clock signal provided to that data subsystem.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 disclose techniques for implementing clock dividers for supporting clock ramp ups and downs associated with, for example, changes in a power mode at a processor. Clock dividers can be built using cascaded flip flops with a multiplexer to control divided clocks for clock ramp up/down. However, the addition of flops in the clock path may increase jitter, which will have an impact on the maximum clock frequency (Fmax) that can be applied to at least one module of the processor. Accordingly, in some embodiments, a clock divider circuit includes a transmission gate multiplexer (mux) in which the clock signal (ClkIn) acts as a select signal that picks between two enable (CKGEN_EnableA and CKGEN_EnableB) inputs. The clock divisor can be adjusted in, for example, 0.5 divider increments (e.g., 1.0, 1.5, 2.0, 2.5, etc.) by modulating the CKGEN_EnableA and CKGEN_EnableB bits applied to the enable inputs. By performing clock divides with a threshold granularity (e.g., 0.5 divider increments), the clock divider supports slower clock ramp up/down during CC6 entry/exit and scan shift reset entry/exit. The slow ramp up/down of clock frequency enabled by the clock divider in turn provides mitigation of problems associated with rapid changes of supply current sometimes referred to herein as di/dt.

The clock divider also enables clock stretching with reduced latency by modifying an existing enable stream of core clock enable signals upon receiving a stretch assertion signal (i.e., StretchEn) that is triggered by detecting a power supply droop. In operation, the CKGEN_EnableA and CKGEN_EnableB bits may be overridden by StrEn assertion (triggered by the power supply droop) to force a stretch in clock frequencies. Further, in some embodiments, the clock divider includes a duty cycle adjuster within the mux to enable duty cycle adjusting. Providing the duty cycle adjuster within the clock divider avoids adding additional stages to support duty cycle adjusting, thereby reducing jitter.

Figure 1:
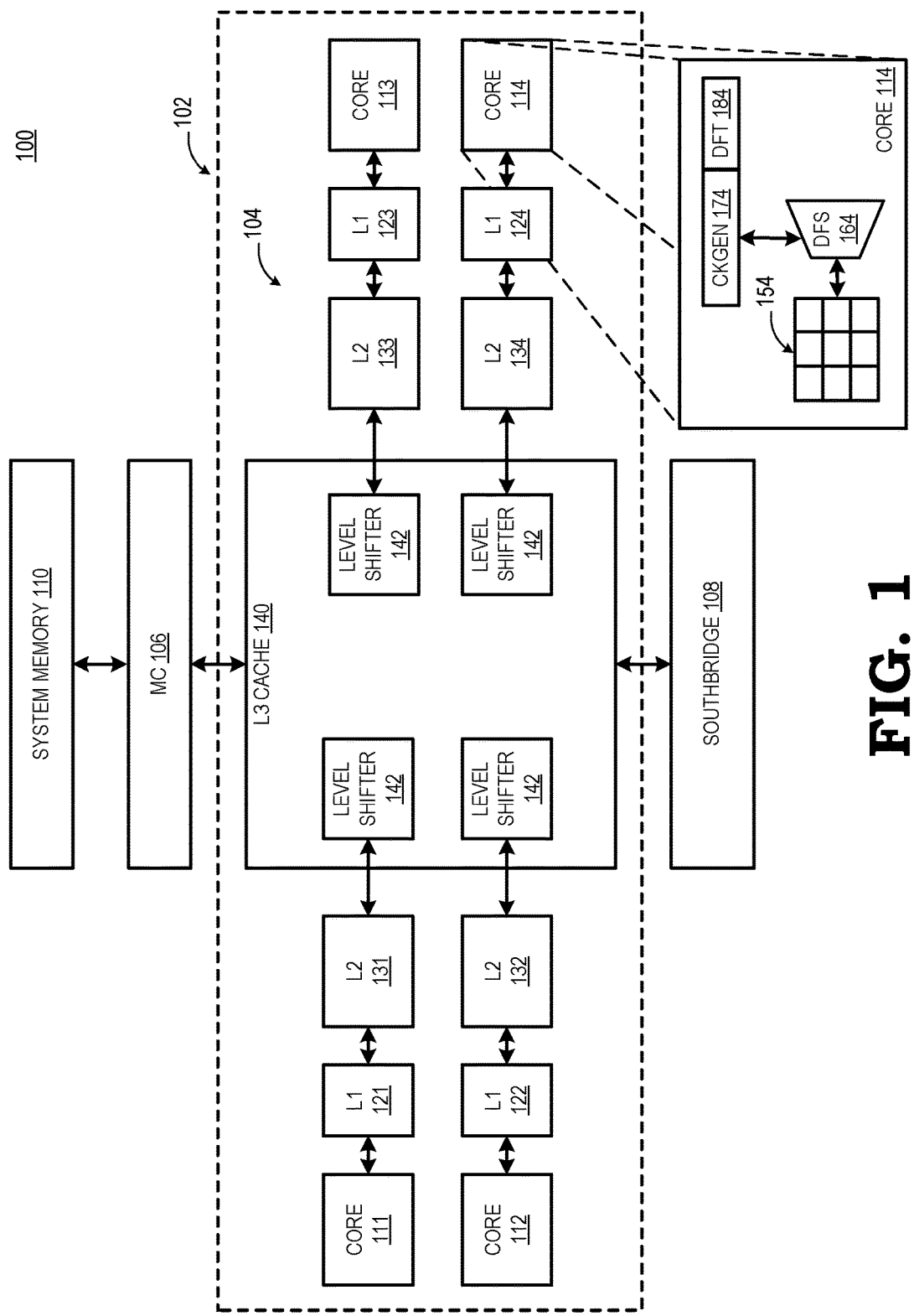
FIG. 1 illustrates a block diagram of a processing system utilizing clock dividers in accordance with at least some embodiments.

FIG. 1 illustrates a block diagram of a processing system 100 utilizing clock dividers in accordance with at least some embodiments. In the depicted example, the processing system 100 includes a compute complex 102 (also known as a "core complex"), a cache hierarchy 104, a memory controller 106, and a southbridge 108. The compute complex 102 includes a plurality of processor cores, such as the four processor cores 111, 112, 113, 114 depicted in the example of FIG. 1. The processor cores may include central processing unit (CPU) cores, graphics processing unit (GPU) cores, digital signal processor (DSP) cores, or a combination thereof. It will be appreciated that the number of processor cores of the compute complex 102 may be fewer or more than four.

The memory controller 106 operates as the interface between the cache hierarchy 104 and a system memory 110. Thus, data to be cached in the cache hierarchy 104 typically is manipulated as blocks of data referred to as "cache lines", and which are addressed or otherwise located in a memory hierarchy using a physical address of system memory 110. Cache lines are accessed from the system memory 110 by the memory controller 106 in response to memory requests from the cache hierarchy 104. Likewise, when a cache line containing modified data is evicted from the cache hierarchy 104 and thus needs to be updated in the system memory 110, the memory controller 106 manages this write-back process. The southbridge 108 operates as the interface between the cache hierarchy 104, the memory controller 106, and one or more peripherals (not shown) of the processing system 100 (e.g., network interfaces, keyboards, mice, displays, and other input/output devices).

Figure 3:
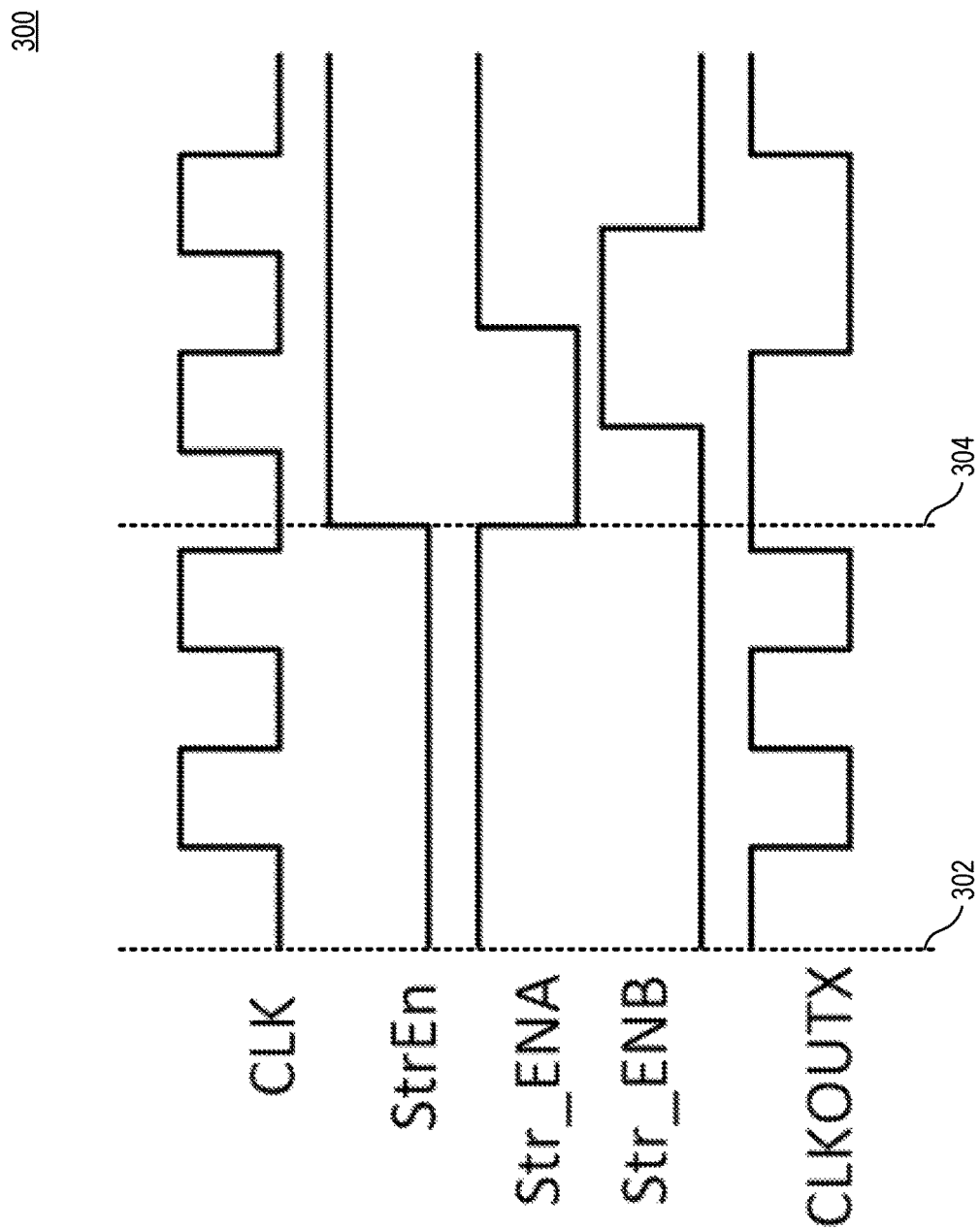
FIG. 3 illustrates a waveform diagram of various clock signals in accordance with some embodiments.

The cache hierarchy 104 includes two or more levels of caches. In the illustrated example, the cache hierarchy 104 includes three cache levels: level 1 (L1), level 2 (L2), and level 3 (L3). For L1, the core complex 102 implements small private caches for each processing core, which are depicted as L1 caches 121, 122, 123, 124, each associated with a corresponding one of processor cores 111-114 as depicted in FIG. 1. For L2, the core complex 102 implements larger private caches for each processor core, which are depicted as L2 caches 131, 132, 133, 134 corresponding to processor cores 111-114, respectively, as also illustrated in FIG. 1. Each of the L2 caches 131-134 is private to its corresponding processor core, but the cache hierarchy 104 operates to maintain coherency between the L2 caches 131-134. The L2 caches 131-134 can be direct mapped or an n-way set associative cache in some embodiments. For the L3 caching level, the cache hierarchy 104 implements an L3 cache 140 that is shared by the processor cores of the core complex 102, and thus shared by at least the L2 caches 131-134. Components of the L3 cache 140 include, but is not limited to, at least one level shifter 142. In some embodiments, such as illustrated in FIG. 3, the L3 cache 140 includes one level shifter 142 per processing core, such as when the processor cores 111-114 have different frequencies and/or voltages.

As illustrated in FIG. 1, each the four processor cores 111, 112, 113, 114 (e.g., processor core 114) includes a clock mesh 154 (also known as a "mesh clock" or a "clock tree"), a digital frequency synthesis logic (DFS) 164, a CKGEN logic 174, and a discrete Fourier transform (DFT) logic 184. The processor core 114 is generally configured to execute sets of instructions (e.g., computer programs) to carry out operations on behalf of an electronic device. To execute the sets of instructions, the processor core includes one or more modules, such as fetch states, dispatch stages, execution units, memory controllers, input/output interfaces, caches, and the like that are each composed of synchronous logic elements, logic gates, and other components. The processor core 114 employs one or more clock signals to synchronize operation of these components. In some embodiments, the processor core 114 receives a synchronized version of a clock signal from the L3 cache, and the clock mesh 154 distributes various versions of the clock signal to the various components of the processor core 114.

The level shifter 142 of the L3 cache 140 provides a P-state clock to the CKGEN logic 174. The CKGEN logic 174 manages problems associated with rapid changes of supply current (i.e., di/dt events) resulting from clock speed and power mode changes (e.g., C-state changes) of the processor core 114. In some embodiments, the DFS 164 is a 2-phase DFS for managing C-state and scan-shift reset behaviors. The DFS 164 performs clock dividing for various modules of the processor core 114, including operations such as clock ramp up or down for C-state entry and exit, clock divides for scan shift reset and two-phase stretch for droop. As further discussed with regards to FIG. 2, each DFS 164 further includes a clock divider circuit and duty cycle adjuster that provides each processor core with independent control of clock ramps, divides, and stretches.

In at least one embodiment, the processor cores 111, 112, 113, 114 ramp the clock frequencies gently to prevent di/dt issues during scan shift reset and when entering and exiting C-states. Switching to high frequency directly will cause a large change in power drawn and associated di/dt issues. In particular, when powering up the processor core 114, the scan shift frequency power is such that the power attach should be gentle (e.g., 100 ns or more from off to full power). For example, during CC6 exit (that is, exit from a given low-power mode), core clocks switch from an OFF state to full frequency. A clock divider circuit in the DFS 164 slowly ramps up the clock frequency by starting with a large divisor and incrementally reducing the divisor. Accordingly, the frequency of the output clock signal changes with the divisor. Similarly, during CC6 entry, the DFS 164 ramps the core clocks in a similar manner, by starting with a low divisor and incrementally ramping up the divisor. In other embodiments, switching to scan shift reset also ramps core clocks down/up in a manner similar to CC6 entry and exit.

In some embodiments, power supply droops created by changes in power draw from power supply result in degradation of the maximum clock frequency (Fmax) or increase in voltage needed to operate the processors 111, 112, 113, 114 (e.g., voltage identification, Vid) required for a particular frequency. The impact of power supply droop can be reduced by stretching the clock upon detection of power supply droop. Accordingly, in response to detecting a supply voltage at one or more locations in the processor core 114 has fallen by a specified threshold amount, a stretch control module (not shown) generates a stretch signal is generated to signal that clock signals should be "stretched", or have their frequencies reduced in response to the voltage droop. For example, upon receiving a stretch assertion signal (i.e., StretchEn) from a droop detector circuit, the DFS 164 stretches clock signals, thereby changing the frequency of clock signals in response to detected voltage droops. The clock stretching performed reduces the power draw, thereby reducing the droop, and allows the logic in the processor more time to stabilize before the next clock edge. Duty cycle compression introduced by process variation on the clock path impacts Fmax. Accordingly, phase timing paths are sensitive to the duty cycle of the clock. In some embodiments, the DFS 164 further includes a fuse-controlled duty cycle adjuster which modulates duty cycles in silicon.

Figure 2:
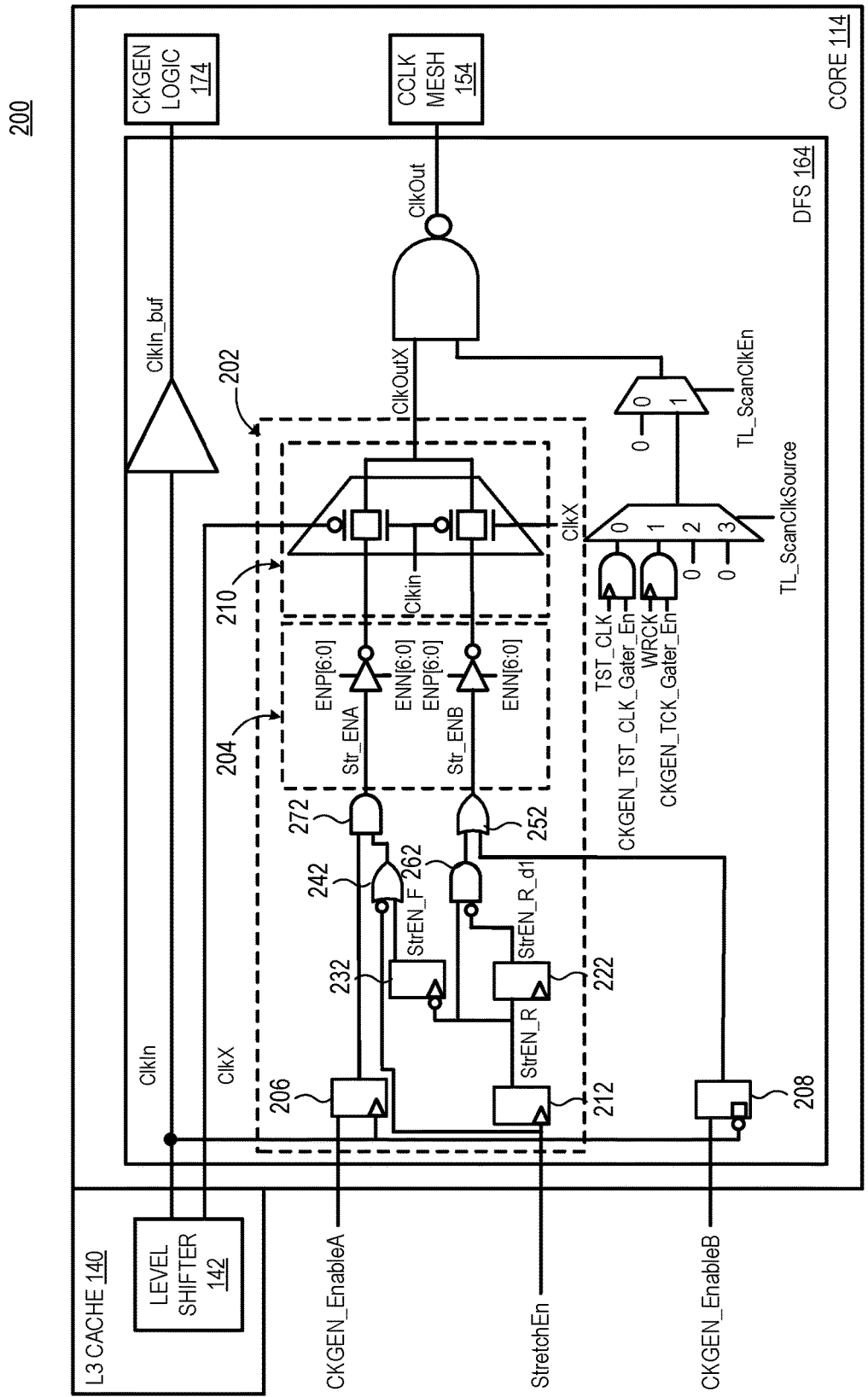
FIG. 2 illustrates a block diagram of a portion of the processor core of FIG. 1 in accordance with some embodiments.

FIG. 2 illustrates a block diagram of a portion 200 of the processor core 114 of FIG. 1 in accordance with some embodiments. The portion 200 includes a clock divider circuit 202 which further includes a duty cycle adjuster 204 and a transmission gate multiplexer (mux) 210 in which a clock signal (ClkIn) acts as a select signal that picks between two enable inputs. The clock divider circuit 202 includes latches 212, 222, 232, OR gates 242, 252, AND gates 262, 272, the duty cycle adjuster 204, and the transmission gate multiplexer (mux) 210. As discussed above with regard to FIG. 1, the processor core 114 receives P-state clock frequencies (e.g., ClkIn and ClkX) from the level shifter 142 of the L3 cache 140. Core clock (CCLK) enable signals (CKGEN_EnableA and CKGEN_EnableB) are driven from rising edge flops in the CKGEN (e.g., CKGEN 174 of FIG. 1) to meet setup time to rising edge flops in the DFS 164. Latches 206 and 208 of the DFS 164 receive and act on the CKGEN_EnableA and CKGEN_EnableB signals, respectively. The latch 206 includes a data input to receive the enable signal CKGEN_EnableA, a clock input to receive the clock signal ClkX, and an output. The latch 208 includes a data input to receive the enable signal CKGEN_EnableB, a clock input to receive the clock signal ClkX, and an output.

In operation, the stretch assertion signal (i.e., StretchEn) is asserted upon detection of a power supply droop to enable clock stretching that picks between two stretch-enable EN signals (i.e., Str_ENA, Str_ENB). Any clock divide in 0.5 increments (e.g., 1.0, 1.5, 2.0, 2.5, etc.) can be achieved by modulating the EN bits. Upon receiving the StretchEn signal, StrEn assertion overrides the CKGEN_EnableA and CKGEN_EnableB bits to force a 100% stretch for a single cycle. The system is designed such that when StretchEn may go high, CKGEN_EnableA=1 and CKGEN_EnableB=0. The clock divider circuit 202 supports clock ramp up/ramp down during CC6 Entry/Exit and scan shift reset entry/exit by performing clock divides with 0.5 granularity (1.0, 1.5, 2.0, 2.5, etc.). Accordingly, clock divider circuit 202 configures a transmission gate mux 210 in which the clock (i.e., ClkX) acts as a select which picks between two EN inputs (and associated logic controlling the two EN inputs). The slow ramp up/down of clock frequency enabled by the clock divider circuit 202 provides di/dt mitigation.

The clock divider circuit 202 also includes a duty cycle adjuster 204 which provides the final EN inputs to the mux 210. Rise and fall edge rate at the output (i.e., ClkOutX) can be adjusted during operations by independently varying the p-channel field-effect transistor (pFET) and n-channel field-effect transistor (nFET) strength of inverters driving the transmission gates. Independent control of pFET and nFET strength using Fuse/JTAG bits (i.e., ENN[6:0], ENP[6:0])

enables duty cycle modulating for improving silicon frequency or testing phase path margin in silicon. Positioning the duty cycle adjuster 204 within the clock divider circuit 202 avoids adding stages to support duty cycle adjusting, thereby reducing jitter.

FIG. 3 illustrates a waveform diagram 300 of various clock signals in accordance with some embodiments. In particular, the waveform diagram 300 shows waveforms for clock divide by 1, followed by stretch. In the illustrated example, between a time 302 and a subsequent time 304, the StrEn signal is in a negated state, indicating that no voltage droop has been detected at the processor core 114. Accordingly, between time 302 and time 304, the frequency of the clock signal output ClkOutX is determined only by the clock divider circuit 202, wherein it generates the ClkOutX to have a frequency equal to the frequency of the input clock signal (i.e., CLK) divided by 1.

At time 304, the StrEn signal is asserted, indicating a voltage droop at the processor core 114. In response, the frequency of ClkOutX is controlled by the two enable (EN) inputs (i.e., Str_ENA, Str_ENB). The clock divider circuit 202 reduces the frequency of ClkOutX relative to its frequency prior to time 304 by 100%, thereby adjusting for the voltage droop. After the single reduced clock period for ClkOutX illustrated in FIG. 3, ClkOutX returns to the same frequency as CLK even though StrEn may remain high. In some embodiments, the CLK input is stretched by other means not included in this disclosure if StrEn remains high. In this way, ClkOutX is stretched faster than may be provided for in systems that stretches CLK.

Figure 4:
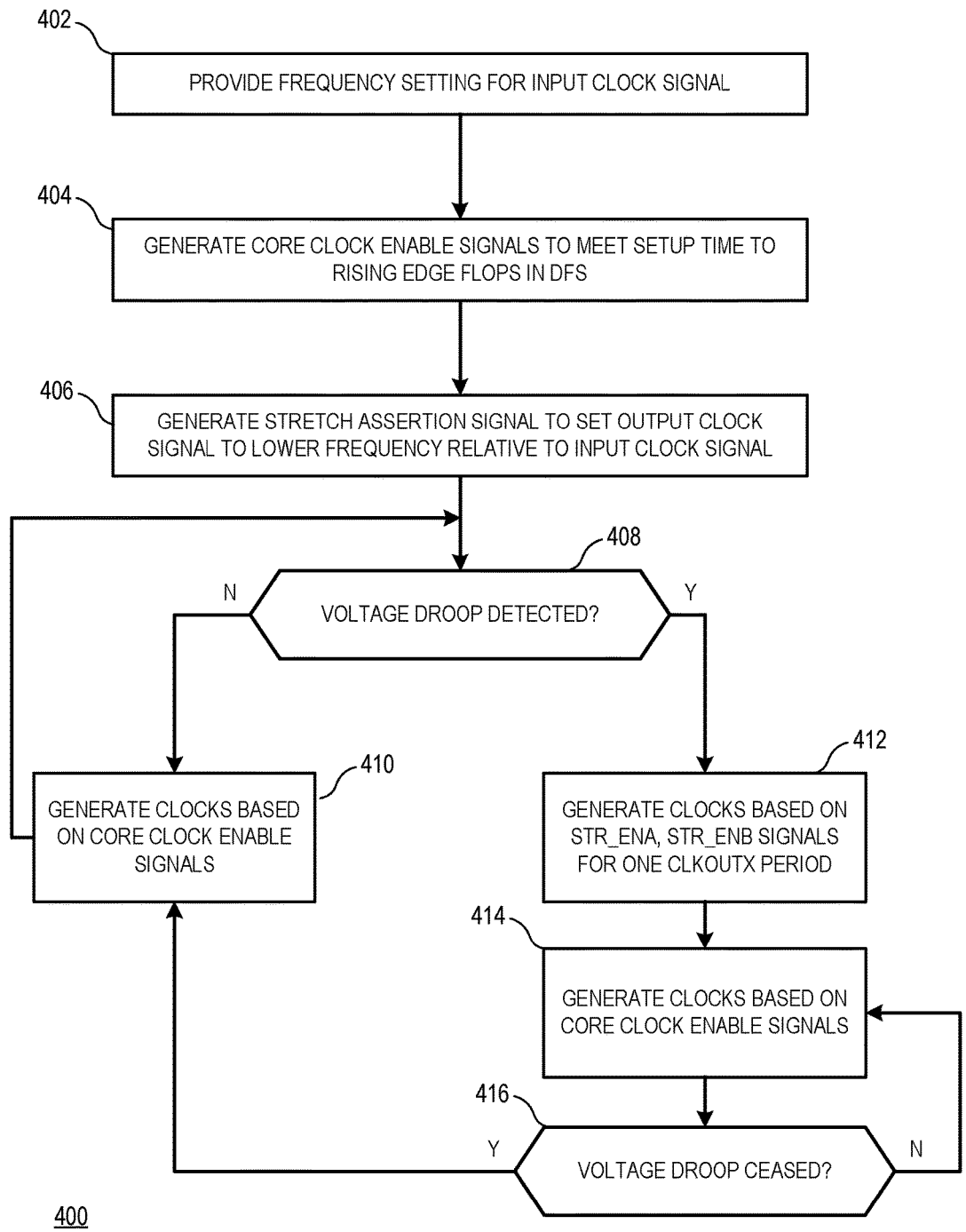
FIG. 4 is a flow diagram of a method of adjusting a clock signal at a processor in response to a voltage droop by adjusting enable signals used to generate the clock signal in accordance with some embodiments.

FIG. 4 illustrates a flow diagram of a method 400 of adjusting a frequency of a clock signal in response to detecting a voltage droop at a processor core in accordance with at least one embodiment. For purposes of description, the method 400 is described with respect to an example implementation at the processor core 114 of FIG. 1 and clock divider circuit 202 of FIG. 2. At block 402, the level shifter 142 at the L3 cache 140 provides a nominal frequency setting for the clock signal ClkX. At block 404, the CKGEN 174 drives CCLK enable signals (CKGEN_EnableA and CKGEN_EnableB) to meet setup time to rising edge flops in the DFS 164. At block 406, a droop detector circuit generates the stretch assertion signal StretchEn for setting the ClkX clock signal to a lower frequency relative to its nominal frequency.

At block 408, the droop detector circuit monitors the voltage at one or more points of the processor core 114 to identify whether a voltage droop is present. If not, the droop detector circuit maintains the StretchEn signal in a negated state. In response, the method flow moves to block 410, and the DFS 164 generates an output clock signal based on the CCLK enable signals (i.e., CKGEN_EnableA and CKGEN_EnableB). The method flow then returns to block 408 as the droop detector circuit continues to monitor the voltage at processor core 114.

Returning to block 408, in response to detecting a voltage droop the droop detector circuit asserts the StretchEn signal. In response, the method flow moves to block 412 and the clock divide circuit 202 generates an output clock signal based on the two stretch-enable EN signals (i.e., Str_ENA, Str_ENB), thus generating an output clock signal at a slower frequency. The input clock signal can be divided with a granularity of 0.5 increments (e.g., 1.0, 1.5, 2.0, 2.5, etc.) by modulating the EN bits. In one example, StretchEn assertion overrides the EN bits to force a 100% stretch for a single cycle. Accordingly, clock divider circuit 202 operates as a transmission gate mux in which the clock (i.e., ClkX) acts as a select which picks between two EN inputs (and associated logic controlling the two EN inputs). The slow ramp up/down of clock frequency enabled by the clock divider circuit 202 provides dI/dT mitigation.

The method flow proceeds to blocks 414 and 416 and the droop detector circuit monitors whether the voltage at the processor core 114 has returned to its nominal level or range. If not, the method returns to block 414 as the clock divider circuit 202 maintains the output clock signal ClkOut on the ClkIn frequency (ClkIn may itself be stretched by a mechanism outside of clock divider circuit 202 after the initial clock stretch from block 412 has had effect). If, at block 416, the droop detector circuit identifies that the monitored voltage has returned to its nominal level or range, and the method flow proceeds to block 410, where the droop detector circuit negates the StretchEn signal, causing the DFS 164 to return to generating the output clock signal at its nominal input frequency.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
inputting a set of core clock enable signals into a clock divider circuit and an input clock signal to a transmission gate multiplexer of the clock divider circuit;
in response to detecting a voltage drop at a processor core, providing a stretch assertion signal to the clock divider circuit that signals the input clock signal to act as a select signal for selecting between one of two stretch-enable signals; and
generating an output clock signal based on the selected stretch-enable signal, wherein the selected stretch-enable signal overrides the set of core clock enable signals to force a stretch in clock frequency of the output clock signal.

2. The method of claim 1, further comprising:
modifying the set of core clock enable signals to generate the stretch-enable signals.

3. The method of claim 2, wherein modifying the set of core clock enable signals comprises:
logically combining the set of core clock enable signals in the clock divider circuit to generate the stretch-enable signals.

4. The method of claim 2, further comprising:
after detecting the voltage drop at the processor core, in response to detecting a voltage increase at the processor core, deasserting the stretch assertion signal to generate the output clock signal based on the set of core clock enable signals.

5. The method of claim 1, wherein generating the output clock signal comprises:
changing a frequency of the output clock signal from a first frequency to a second frequency, wherein the second frequency is less than the first frequency.

6. The method of claim 5, further comprising:
after detecting the voltage drop at the processor core, in response to detecting a voltage increase at the processor core, modifying the output clock signal from the second frequency to a third frequency, wherein the third frequency is greater than the second frequency.

7. A method, comprising:
generating a set of core clock enable signals;
inputting the set of core clock enable signals to a clock divider circuit;
generating a first output clock signal at a first frequency based on the set of core clock enable signals; and
in response to detecting a voltage drop at the processor core, providing a stretch assertion signal that signals an input clock signal at a transmission gate multiplexer to act as a select signal for selecting between one of two stretch-enable signals; and
generating a second output clock signal based on the selected stretch-enable signal, wherein the selected stretch-enable signal overrides the set of core clock enable signals to force a stretch in clock frequency of the second output clock signal.

8. The method of claim 7, further comprising:
modifying the set of core clock enable signals to generate stretch-enable signals.

9. The method of claim 7, further comprising:
in response to detecting the voltage drop at the processor core, changing a frequency of the second output clock signal from the first frequency to a second frequency, wherein the second frequency is less than the first frequency.

10. The method of claim 9, further comprising:
in response to detecting a voltage increase at the processor core after the voltage drop, changing a frequency of the second output clock signal from the second frequency to a third frequency, wherein the third frequency is greater than the second frequency.

11. The method of claim 7, further comprising:
after detecting the voltage drop at the processor core, in response to detecting a voltage increase at the processor core, deasserting the stretch assertion signal to generate the second output clock signal based on the set of core clock enable signals.

12. A processor, comprising:
a processor core;
a droop detector circuit to detect a voltage drop at the processor core;
a clock divider circuit to receive a set of core clock enable signals and an input clock signal, the clock divider circuit to receive, in response to detecting the voltage drop, a stretch assertion signal that signals an input clock signal to act as a select signal for selecting between one of two stretch-enable signals, wherein the clock divider circuit is further to generate an output clock signal based on the selected stretch-enable signal by overriding the set of core clock enable signals to force a stretch in clock frequency.

13. The processor of claim 12, wherein the clock divider circuit further comprises:
a transmission gate multiplexer for selecting between the one of two stretch-enable signals.

14. The processor of claim 13, wherein the clock divider circuit is further to:
logically combine the set of core clock enable signals in the clock divider circuit to generate the two stretch-enable signals.

15. The processor of claim 12, wherein the clock divider circuit is further to:
in response to the droop detector circuit detecting a voltage drop at the processor core, change a frequency of the output clock signal from a first frequency to a second frequency, wherein the second frequency is less than the first frequency.

16. The processor of claim 15, wherein the clock divider circuit is further to:
subsequent to the droop detector circuit detecting a voltage drop, in response to detecting a voltage increase at the processor core, modify the output clock signal from the second frequency to a third frequency, wherein the third frequency is greater than the second frequency.

17. The processor of claim 12, the clock divider circuit further comprising:
a duty cycle adjuster configured to change at least one of a rising edge rate or a falling edge rate of the output clock signal.

18. The processor of claim 17, wherein:
the duty cycle adjuster includes at least one strength-controller inverter.

* * * * *